United States Patent [19]

Saotome

[11] Patent Number: 4,816,688
[45] Date of Patent: Mar. 28, 1989

[54] RADIATION IMAGE READ-OUT APPARATUS FOR STIMULABLE PHOSPHOR SHEET

[75] Inventor: Shigeru Saotome, Kanagawa, Japan

[73] Assignee: Fuji Photo Film Co., Ltd., Kanagawa, Japan

[21] Appl. No.: 742,666

[22] Filed: Jun. 7, 1985

[30] Foreign Application Priority Data

Jun. 11, 1984 [JP] Japan ................. 59-119656

[51] Int. Cl.⁴ ................................. G01T 1/105
[52] U.S. Cl. ..................... 250/484.1; 250/327.2
[58] Field of Search ............... 250/327.2, 484.1

[56] References Cited

U.S. PATENT DOCUMENTS 4,258,264 3/1981 Kotera et al. ............... 250/484.1
4,346,295 8/1982 Tanaka et al. ............... 250/327.2

Primary Examiner—Janice A. Howell
Assistant Examiner—Constantine Hannaher
Attorney, Agent, or Firm—Sughrue, Mion, Zinn, Macpeak & Seas

[57] ABSTRACT

A radiation image read-out apparatus comprises a source for emitting stimulating rays for scanning a stimulable phosphor sheet carrying a radiation image stored therein, a photoelectric read-out means for detecting light emitted by the stimulable phosphor sheet when it is scanned by stimulating rays, and a reflection mirror positioned near a portion of the stimulable phosphor sheet where stimulating rays impinge thereupon for reflecting light emitted by the stimulable phosphor sheet towards the photoelectric read-out system. The reflection mirror is fabricated to be moveable between a position at which the reflection mirror reflects light, which is emitted by the stimulable phosphor sheet, towards the photoelectric read-out means and a position at which the reflection mirror does not reflect stimulating rays, which are reflected by the stimulable phosphor sheet, towards the stimulable phosphor sheet.

7 Claims, 2 Drawing Sheets

RADIATION IMAGE READ-OUT APPARATUS FOR STIMULABLE PHOSPHOR SHEET

BACKGROUND OF THE INVENTION

1. Field of the Invention

This invention relates to a radiation image read-out apparatus for use in a radiation image recording and reproducing system.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

FIG. 2 is a perspective view showing the conventional read-out apparatus used in the aforesaid radiation image recording and reproducing system for scanning a stimulable phosphor sheet carrying a radiation image stored therein by stimulating rays such as a laser beam which cause the sheet to emit light in proportion to the stored radiation energy, and photoelectrically detecting the emitted light.

In the apparatus of FIG. 2, stimulating rays 2 are emitted by a stimulating ray source 1, and the beam diameter of the stimulating rays 2 is strictly adjusted by a beam expander 3. The stimulating rays 2 are then deflected by a light deflector 4 formed of a galvanometer mirror or the like, and are made to impinge upon the stimulable phosphor sheet 10 by a plane reflection mirror 5. Between the light deflector 4 and the plane reflection mirror 5 is positioned an f$\theta$ lens 6 for maintaining the beam diameter of the stimulating rays 2 uniform during the equal-speed scanning of the stimulating rays 2 on the stimulable phosphor sheet 10. While the stimulating rays 2 impinge upon the stimulable phosphor sheet 10, the sheet 10 is moved in the direction as indicated by the arrow A (i.e. sub-scanning direction) and, consequently, the whole area of the sheet 10 is exposed to and scanned by the stimulating rays 2. Upon exposure to the stimulating rays 2, the stimulable phosphor sheet 10 emits light in proportion to the radiation energy stored therein, and the light emitted enters a light guide member 8. The light guide member 8 has a linear light input face 8a positioned close to the scanning line on the stimulable phosphor sheet 10, and a ring-shaped light output face 8b in close contact with the light receiving face of a photodetector 9, which may be a photomultiplier. The light guide member 8 and the photodetector 9 constitute a photoelectric read-out means 7. The light guide member 8 is fabricated of a transparent thermoplastic resin sheet such as an acrylic resin sheet so that the light entering from the light input face 8a can be transmitted to the light output face 8b by total reflection inside of the light guide member 8. The light emitted by the stimulable phosphor sheet 10 upon stimulation thereof is guided inside of the light guide member 8, emitted from the light output face 8b of the light guide member 8 and received by the photodetector 9. The light guide member 8 may be of a shape and a material as disclosed in U.S. Pat. No. 4,346,295.

The light receiving face of the photodetector 9 is provided with a filter (not shown) for transmitting only the light having the wavelength distribution of the light emitted by the stimulable phosphor sheet 10 and cutting off the light having the wavelength distribution of the stimulating rays 2, so that the photodetector 9 can detect only the light emitted by the stimulable phosphor sheet 10 upon stimulation thereof. The light detected by the photodetector 9 is converted into an electric signal, amplified to an appropriate level by an amplifier 11 the sensitivity of which has been adjusted by an amplification degree setting value (a), and then sent to an A/D converter 12. In the A/D converter 12, the electric signal is converted into a digital signal by use of a scale factor which has been set by a scale factor setting value (b) adjusted in advance in accordance with the image pattern of an object to suit the width of signal fluctuation. The digital signal thus obtained is sent to a signal processing circuit 13, in which it is processed to obtain a radiation image suitable for viewing, particularly for diagnostic purposes. The electric image signal obtained by the signal processing circuit 13 is then used to reproduce a visible image on a recording material such as a photographic film or a display device such as a CRT.

Generally the radiation image read-out apparatus is provided with a reflection mirror 14 for obtaining an image of high quality by improving the light guiding efficiency for the light emitted by the stimulable phosphor sheet 10 when it is exposed to the stimulating rays 2. The reflection mirror 14 is positioned on the side opposite to the light guide member 8 with respect to the scanning line of the stimulating rays 2 on the stimulable phosphor sheet 10 so as to reflect the light, which is emitted by the sheet 10 in the direction reverse to the light guide member 8, towards the light guide member 8.

FIG. 3 is a schematic side view taken in the direction as indicated by the arrow B of FIG. 2 and showing the condition of reflection of stimulating rays. In general, in the image read-out as described above, stimulating rays 2a (hereinafter referred to as the scanning stimulating rays) impinging upon the stimulable phosphor sheet 10 for scanning it are reflected by the sheet 10. Reflected stimulating rays 2b are again reflected by various components (the reflection mirror 14, the light input face 8a of the light guide member 8, etc.) of the read-out apparatus onto portions of the sheet 10 that have not yet been scanned, thereby stimulating the non-scanned portions and causing them to emit light (this phenomenon is hereinafter referred to as the flare phenomenon). When the flare phenomenon arises, since the reflected stimulating rays 2b again impinge upon the non-scanned portions of the sheet 10 outside of the picture element detected at a given instant by scanning with the scanning stimulating rays 2a, light emitted by the non-scanned portions is detected by the photoelectric read-out means 7 together with the light emitted by the scanned picture element of the sheet 10. Therefore, the reproduced image thus obtained becomes incorrect, and contrast of the image becomes low.

In the radiation image read-out apparatus provided with the reflection mirror 14, the reflection mirror 14 constitutes a main cause of the flare phenomenon. This is because, though the reflection mirror 14 improves the light guiding efficiency by reflecting the light emitted by the stimulable phosphor sheet 10 towards the light guide member 8, it also reflects the scanning stimulating rays 2a. Therefore, the stimulating rays 2b reflected by the sheet 10 are further reflected by the reflection mirror 14 onto the light input face 8a of the light guide member 8 and then reflected by the light input face 8a onto the non-scanned portions of the sheet 10. Or, as shown in FIG. 4 taken in the direction as indicated by the arrow D of FIG. 3, the stimulating rays 2b reflected by the sheet 10 in the transverse direction (at an angle normal to the drawing sheet in FIG. 3, i.e. in the direction as indicated by the arrow C in FIG. 2) are further reflected by the reflection mirror 14 and impinge upon the non-scanned portions of the sheet 10 outside of the scanned picture element.

SUMMARY OF THE INVENTION

The primary object of the present invention is to provide a radiation image read-out apparatus which eliminates at least the flare phenomenon caused by a reflection mirror.

Another object of the present invention is to provide a radiation image read-out apparatus which normally improves the light guiding efficiency for the light emitted by a stimulable phosphor sheet by use of a reflection mirror, and which decreases the flare phenomenon when decrease of the flare phenomenon is more important for viewing purposes than improvement in the light guiding efficiency for the light emitted by the stimulable phosphor sheet.

The present invention provides a radiation image read-out apparatus including a stimulating ray source for emitting stimulating rays for scanning a stimulable phosphor sheet carrying a radiation image stored therein, a photoelectric read-out means for guiding and photoelectrically detecting light emitted by said stimulable phosphor sheet when it is scanned by said stimulating rays, and a reflection mirror positioned in the vicinity of a portion of said stimulable phosphor sheet where said stimulating rays impinge upon said stimulable phosphor sheet, said reflection mirror reflecting said light, which is emitted by said stimulable phosphor sheet, towards said photoelectric read-out means, wherein the improvement comprises fabricating said reflection mirror to be moveable between a position at which said reflection mirror reflects said light, which is emitted by said stimulable phosphor sheet, towards said photoelectric read-out means and a position at which said reflection mirror does not reflect said stimulating rays, which are reflected by said stimulable phosphor sheet, towards said stimulable phosphor sheet.

By "position at which a reflection mirror reflects light, which is emitted by a stimulable phosphor sheet, towards a photoelectric read-out means" is meant a position at which the reflection mirror can exhibit the function of improving the light guiding efficiency for the light emitted by the stimulable phosphor sheet.

By "position at which a reflection mirror does not reflect stimulating rays, which are reflected by a stimulable phosphor sheet, towards the stimulable phosphor sheet" is meant a position at which the reflection mirror does not cause the problem that stimulating rays reflected by the stimulable phosphor sheet are further reflected by the reflection mirror onto non-scanned portions of the sheet outside of the scanned picture element and light emitted by the non-scanned portions is detected by the photoelectric read-out means and adversely affects the image quality of a reproduced visible image. Therefore, the aforesaid position may be a position at which stimulating rays reflected by the stimulable phosphor sheet do not impinge upon the reflection mirror, or a position at which stimulating rays reflected by the sheet onto the reflection mirror and then by the reflection mirror do not impinge upon the sheet. The aforesaid position may also be a position at which, even though stimulating rays are reflected by the reflection mirror onto portions of the sheet, light emitted by the sheet portions does not impinge upon the light guide member, or a position at which, even though stimulating rays are reflected by the reflection mirror onto portions of the sheet and light emitted by the sheet portions impinges upon the light guide member, the amount of the emitted light is very small and does not substantially cause adverse effects on the image quality of a reproduced visible image.

As described above, from the viewpoint that the reflection mirror is one of the major causes of the flare phenomenon, the apparatus of the present invention is fabricated to substantially avoid the flare phenomenon caused by the reflection mirror by moving the reflection mirror away from the position at which it exhibits the function of guiding the light emitted by the stimulable phosphor sheet to the light guide member.

In the radiation image read-out apparatus of the present invention, the reflection mirror is fabricated to be moveable between a position at which the reflection mirror reflects light, which is emitted by the stimulable phosphor sheet, towards the photoelectric read-out means and a position at which the reflection mirror does not reflect stimulating rays, which are reflected by the stimulable phosphor sheet, towards the stimulable phosphor sheet. Therefore, when the flare phenomenon need not be decreased, it is possible to move the reflection mirror to a position at which the reflection mirror reflects light, which is emitted by the stimulable phosphor sheet, towards the photoelectric read-out means, and to improve the light guiding efficiency for the light emitted by the sheet by efficiently utilizing the function of the reflection mirror. When the flare phenomenon should be decreased, for example, when high image contract is required, it is possible to move the reflection mirror to a position at which the reflection mirror does not reflect stimulating rays, which are reflected by the sheet, towards the sheet and to avoid at least the flare phenomenon caused by the reflection mirror. Thus, it is possible to improve the image contrast.

DESCRIPTION OF THE PREFERRED EMBODIMENTS

The present invention will hereinbelow be described in further detail with reference to the accompanying drawings.

Figure 1A:
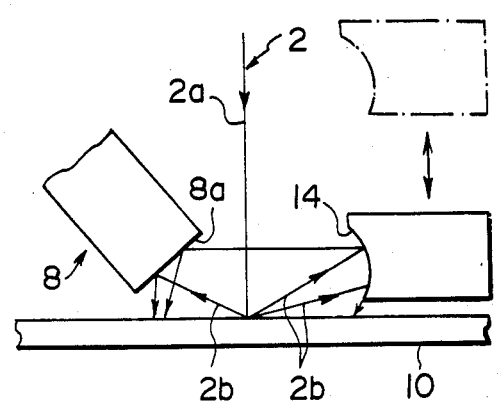
FIG. 1A is a schematic side view showing a major part of an embodiment of the radiation image read-out apparatus in accordance with the present invention.

In FIG. 1A, a reflection mirror 14 is fabricated for vertical movement between a position as indicated by the solid line at which the reflection mirror 14 reflects light, which is emitted by a stimulable phosphor sheet 10, towards a photoelectric read-out means 7, and a position as indicated by the chain line at which the reflection mirror 14 does not reflect stimulating rays 2b, which are reflected by the stimulable phosphor sheet 10, towards the sheet 10.

When the reflection mirror 14 is moved to the position at which it reflects light, which is emitted by the sheet 10, towards the photoelectric read-out means 7, particularly towards a light input face 8a of a light guide member 8, the reflection mirror 14 exhibits the function of guiding the emitted light.

When the reflection mirror 14 is moved to the position at which it does not reflect the reflected stimulating rays 2b towards the sheet 10, it is possible to eliminate the flare phenomenon caused by the reflection mirror 14 and substantial adverse effects of the flare phenomenon on a reproduced visible image.

Figure 1B:
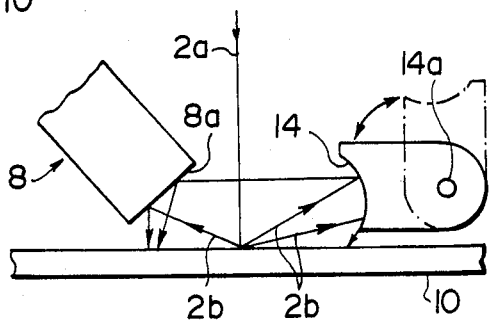
FIG. 1B is a schematic side view showing a major part of another embodiment of the radiation image read-out apparatus in accordance with the present invention.
Figure 3:
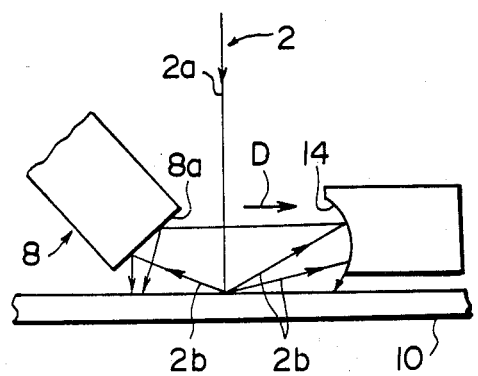
FIG. 3 is a schematic side view taken in the direction as indicated by the arrow B of FIG. 2 and showing the condition of reflection of stimulating rays.
Figure 4:
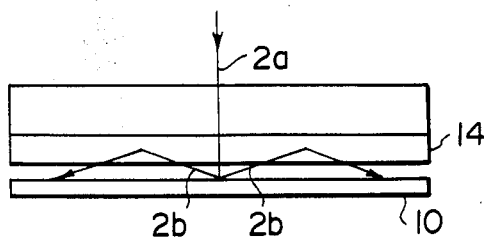
FIG. 4 is a schematic view taken in the direction as indicated by the arrow D of FIG. 3 and showing the condition of reflection of stimulating rays.
Figure 2:
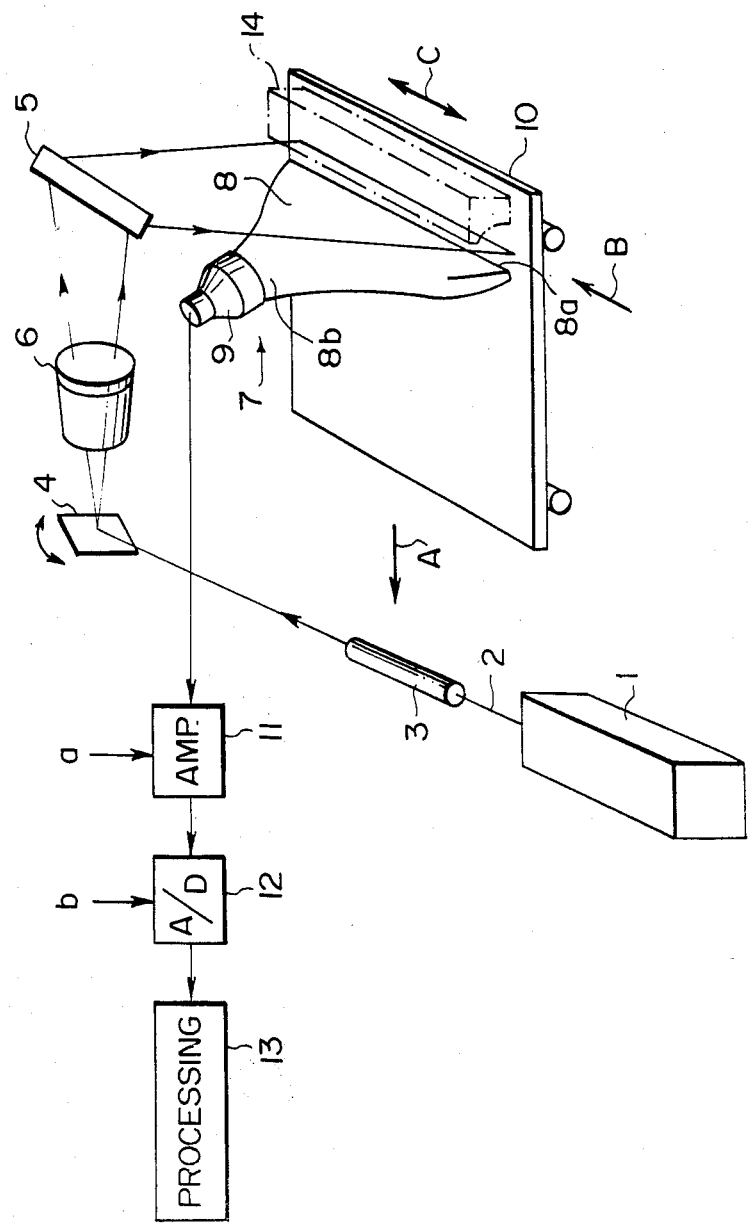
FIG. 2 is a perspective view showing the conventional radiation image read-out apparatus.

Movement of the reflection mirror 14 is conducted by use of a known means (not shown) which can vertically move the reflection mirror 14. However, it is also possible to transversely move the reflection mirror 14 and to use any other movement method. For example, as shown in FIG. 1B, the reflection mirror 14 may be rotatably supported by a shaft 14a and may be rotated to the position as indicated by the solid line and to the position as indicated by the chain line.

Since the radiation image read-out apparatus of the present invention is fabricated as described above, it is possible to move the reflection mirror 14 to the normal position for reflecting the light emitted by the stimulable phosphor sheet 10 towards the photoelectric read-out means, so that the light guiding efficiency for the light emitted by the stimulable phosphor sheet 10 is improved by the reflection mirror 14. When decrease in the flare phenomenon is more important for viewing, particularly for diagnostic purposes, than improvement in the light guiding efficiency, for example, when a slight difference in contrast should be discriminated as in the case where a tumor image near a portion of the stimulable phosphor sheet exposed to a high radiation dose outside of the object is diagnosed or minute calcification is diagnosed in mammography, it is possible to move the reflection mirror 14 to the position where the stimulating rays reflected by the stimulable phosphor sheet 10 are not reflected by the reflection mirror 14 towards the sheet 10, thereby avoiding the flare phenomenon caused by the reflection mirror 14 and improving the contrast. Accordingly, it is possible to conduct image read-out in a manner most suitable for purposes of image read-out.

It is possible to judge whether to achieve improvement in the light guiding efficiency for the light emitted by the stimulable phosphor sheet or to achieve decrease in the flare phenomenon on the basis of an image recording portion of the object, such as the chest or abdomen, the image recording method such as plain image recording, contrasted image recording or enlargement, or the image recording conditions, such as the exposure field size.

Also, there has been proposed a technique of conducting stimulating ray reflection preventing treatment on the reflection mirror or the light input face of the light guide member, for example, overlaying a stimulating ray reflection preventing film thereon. In this technique, since not only prevention of stimulating ray reflection but also reflection or guiding of the light emitted by the stimulable phosphor sheet are required, it is not always possible to accomplish complete prevention of stimulating ray reflection. The radiation image read-out apparatus of the present invention is applicable also to the case where the reflection mirror and/or the light guide member is subjected to stimulating ray reflection preventing treatment as described above.

I claim:

1. A radiation image read-out apparatus including a stimulating ray source for emitting stimulating rays for scanning a stimulable phosphor sheet carrying a radiation image stored therein, a photoelectric read-out means for guiding and photoelectrically detecting light emitted by said stimulable phosphor sheet when it is scanned by said stimulating rays, and a reflection mirror positioned in the vicinity of a portion of said stimulable phosphor sheet where said stimulating rays impinge upon said stimulable phosphor sheet, said reflection mirror reflecting said light, which is emitted by said stimulable phosphor sheet, towards said photoelectric read-out means, wherein the improvement comprises fabricating said reflection mirror to be moveable between a position at which said reflection mirror reflects said light, which is emitted by said stimulable phosphor sheet, towards said photoelectric read-out means and a position at which said reflection mirror does not reflect said stimulating rays, which are reflected by said stimulable phosphor sheet, towards said stimulable phosphor sheet.

2. An apparatus as defined in claim 1 wherein said reflection mirror is vertically moveable.

3. An apparatus as defined in claim 1 wherein said reflection mirror is rotatable around a rotation shaft.

4. An apparatus as defined in claim 1, 2 or 3 wherein said position at which said reflection mirror does not reflect said stimulating rays, which are reflected by said stimulable phosphor sheet, towards said stimulable phosphor sheet is a position at which said stimulating rays reflected by said stimulable phosphor sheet do not impinge upon said reflection mirror.

5. An apparatus as defined in claim 1, 2 or 3 wherein said position at which said reflection mirror does not reflect said stimulating rays, which are reflected by said stimulable phosphor sheet, towards said stimulable phosphor sheet is a position at which said stimulating rays reflected by said stimulable phosphor sheet onto said reflection mirror and then by said reflection mirror do not impinge upon said stimulable phosphor sheet.

6. A radiation image read-out apparatus including a stimulating ray source for emitting stimulating rays for scanning a stimulable phosphor sheet carrying a radiation image stored therein, a photoelectric read-out means for guiding and photoelectrically detecting light emitted by said stimulable phosphor sheet when it is scanned by said stimulating rays, and a reflection mirror positioned in the vicinity of a portion of said stimulable phosphor sheet where said stimulating rays impinge upon said stimulable phosphor sheet, wherein the improvement comprises fabricating said reflection mirror to be moveable between a position at which said reflection mirror reflects said light which is emitted by said stimulable phosphor sheet towards said photoelectric read-out means and a position at which, even though said stimulating rays are reflected by said reflection mirror onto portions of said stimulable phosphor sheet, the light emitted by said sheet portions does not impinge upon said photoelectric read-out means.

7. A radiation image read-out apparatus including a stimulating ray source for emitting stimulating rays for scanning a stimulable phosphor sheet carrying a radiation image stored therein, a photoelectric read-out means for guiding and photoelectrically detecting light emitted by said stimulable phosphor sheet when it is scanned by said stimulating rays, and a reflection mirror positions in the vicinity of a portion of said stimulable phosphor sheet where said stimulating rays impinge upon said stimulable phosphor sheet towards said photoelectric read-out means, wherein the improvement comprises fabricating said reflection mirror to be moveable between a position at which said reflection mirror reflects said light which is emitted by said stimulable phosphor sheet towards said photoelectric read-out means and a position at which, even though said stimulating rays are reflected by said reflection mirror onto portions of said stimulable phosphor sheet and the light emitted by said sheet portions impinges upon said photoelectric means, the amount of the emitted light is very small and does not substantially cause adverse effects on a reproduced visible image.

* * * * *